No. 731,653.

Patented June 23, 1903.

UNITED STATES PATENT OFFICE.

JOHN AYLING, OF TORONTO JUNCTION, CANADA.

FIRE-BRICK.

SPECIFICATION forming part of Letters Patent No. 731,653, dated June 23, 1903.

Application filed October 29, 1902. Serial No. 129,205. (No model.)

*To all whom it may concern:*

Be it known that I, JOHN AYLING, brickmaker, of Toronto Junction, in the county of York, Province of Ontario, Canada, have invented a new and useful Improvement in Fire-Bricks, (for which I have obtained a patent in Canada, No. 77,521, dated September 23, 1902,) of which the following is a specification.

My invention consists of a composition for the manufacture of fire-bricks; and it consists of the following ingredients mixed in the following proportions: hard-coal ashes, six parts; shale, three parts; fire-clay, one part.

To the above ingredients I add water and place in a mixer and thoroughly agitate until the matter becomes pugged or ready for forming or shaping.

I take the above, form into bricks, and burn for from five to seven days in a kiln at a temperature of about 3,000°. I may also add the necessary amount of salt when burning to glaze the bricks.

What I claim, and desire to secure by Letters Patent, is—

1. As an article of manufacture, a fire-brick made from hard-coal ashes, shale, and fire-clay, substantially as specified.

2. As an article of manufacture, a fire-brick consisting of hard-coal ashes six parts, shale three parts, and fire-clay one part, substantially as specified.

Toronto, October 25, 1902.

JOHN AYLING.

In presence of—
ANDREW A. ADAMS,
W. A. SMITH.